No. 788,579. PATENTED MAY 2, 1905.
W. S. BROWNE.
GAS ENGINE.
APPLICATION FILED APR. 11, 1903.
6 SHEETS—SHEET 3.
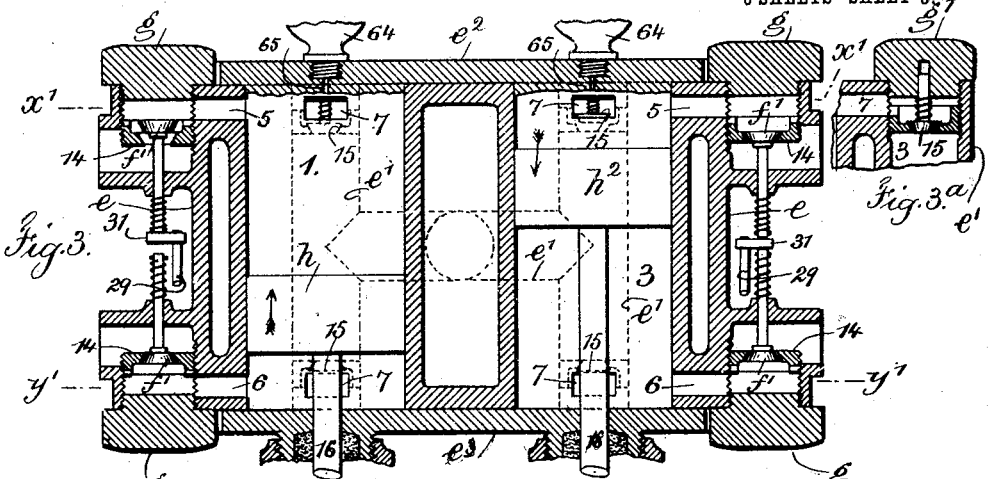
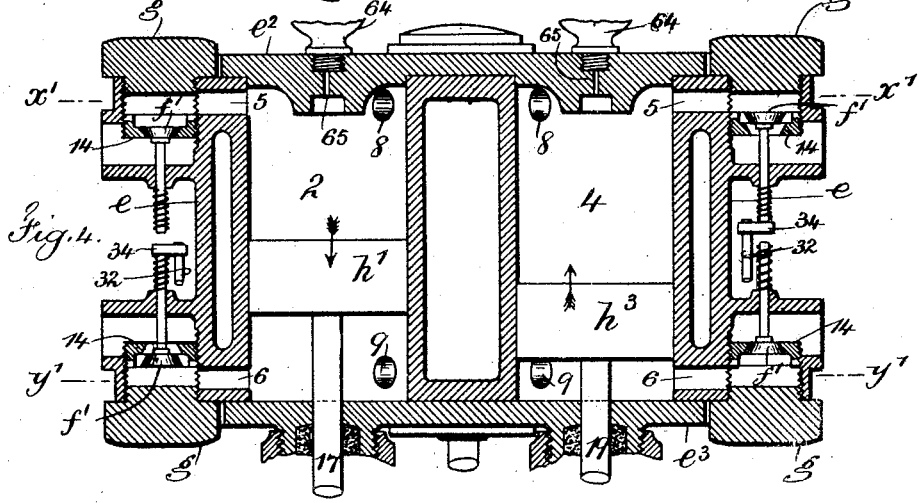
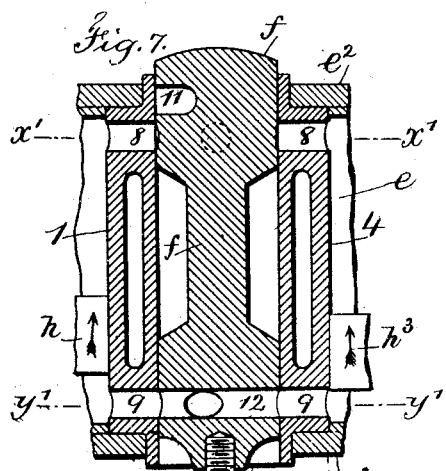
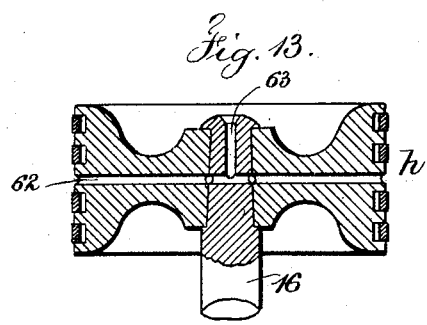
Witnesses
Chas H Smith
J. Staib
Inventor
Walram S. Browne.
Harold Serrell
Atty

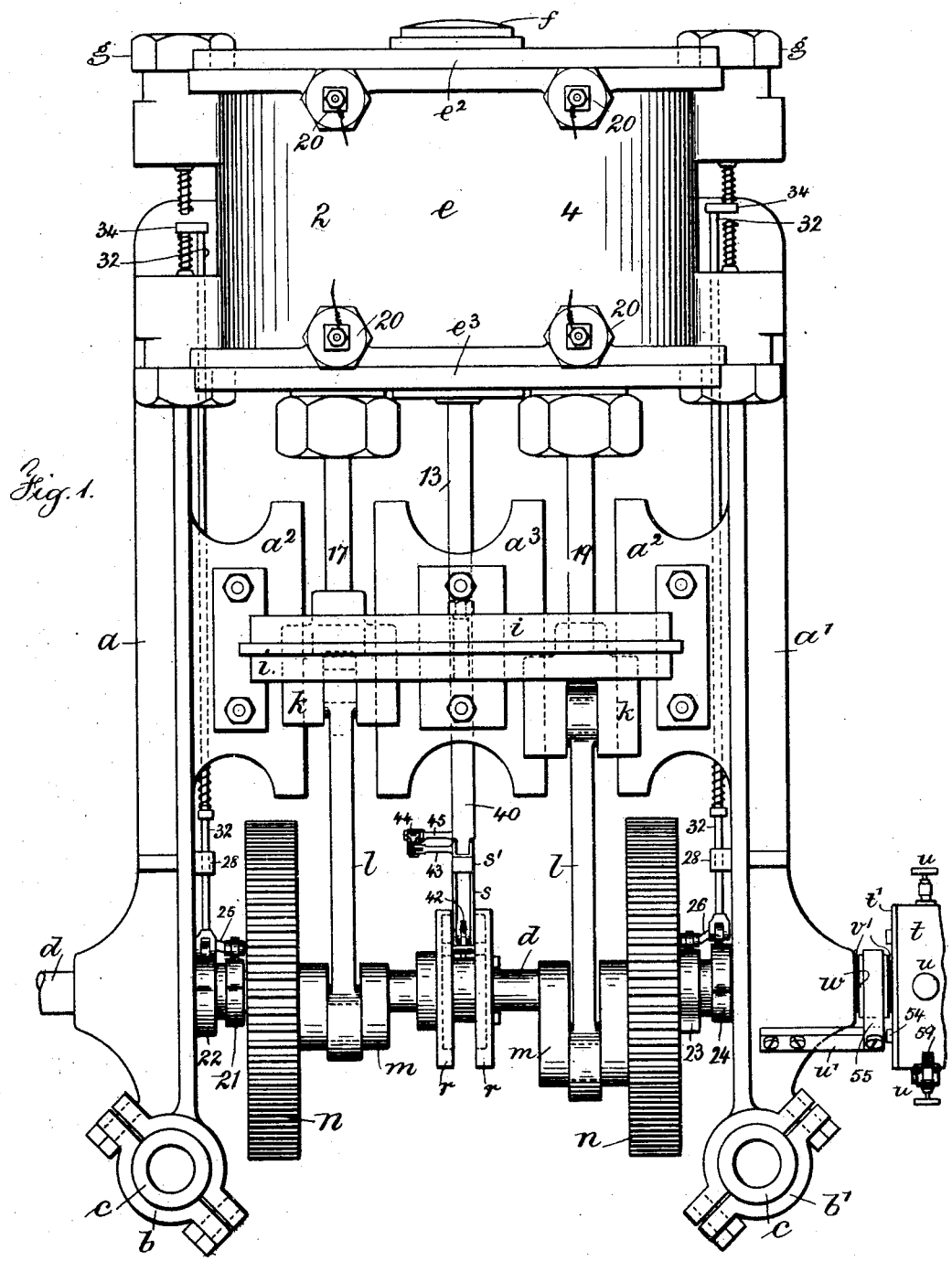

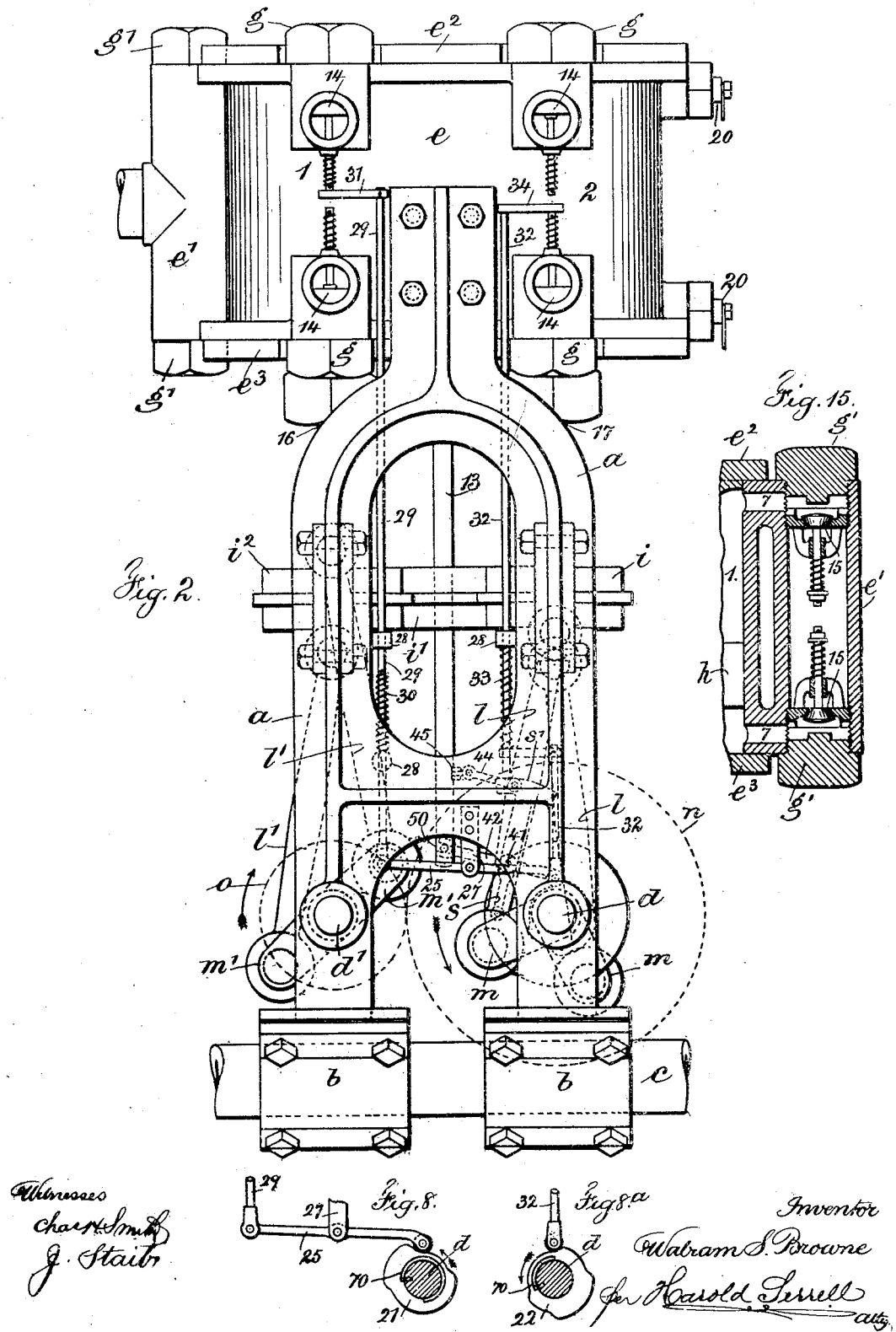

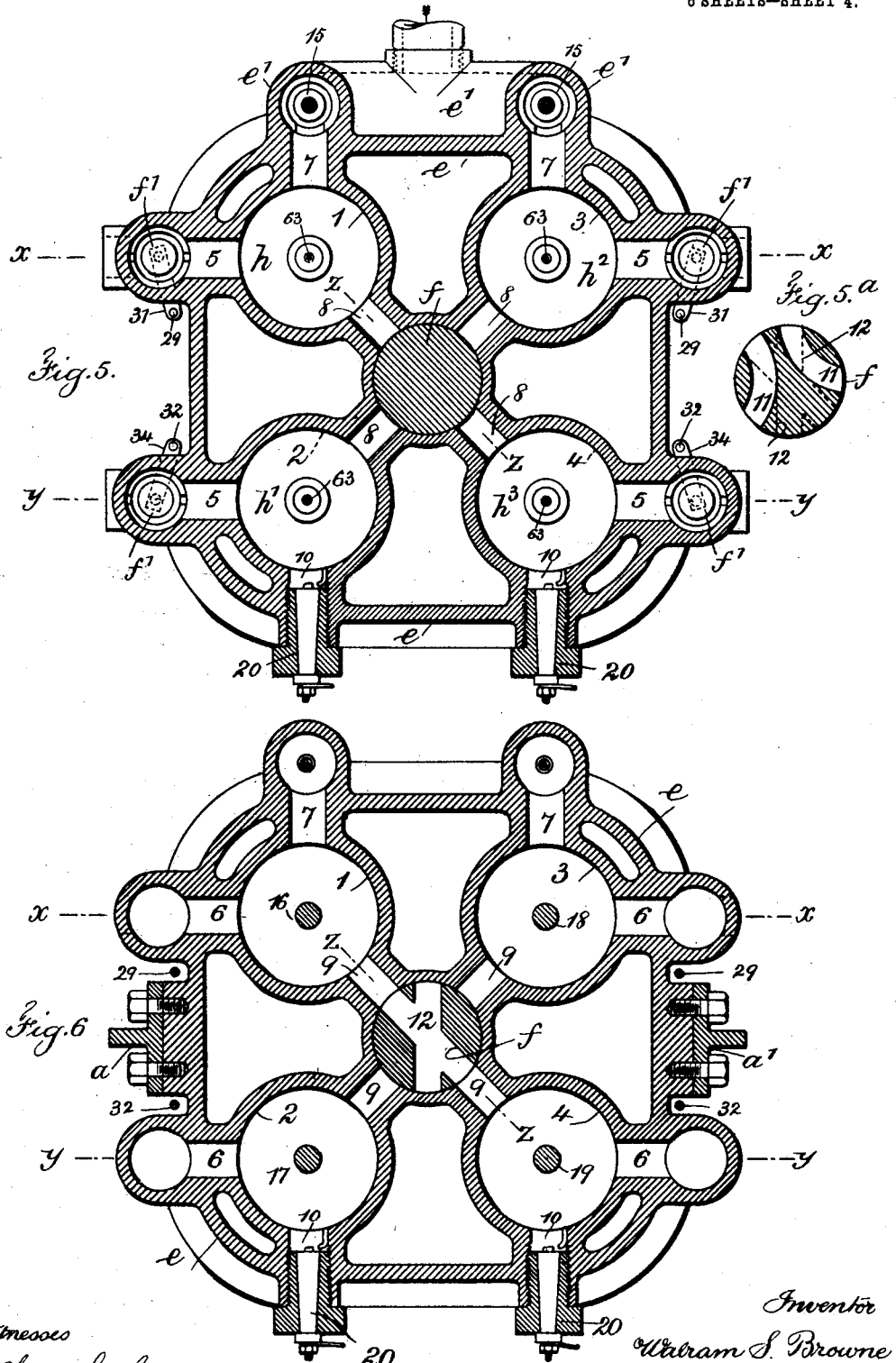

No. 788,579. PATENTED MAY 2, 1905.
W. S. BROWNE.
GAS ENGINE.
APPLICATION FILED APR. 11, 1903.
6 SHEETS—SHEET 5.
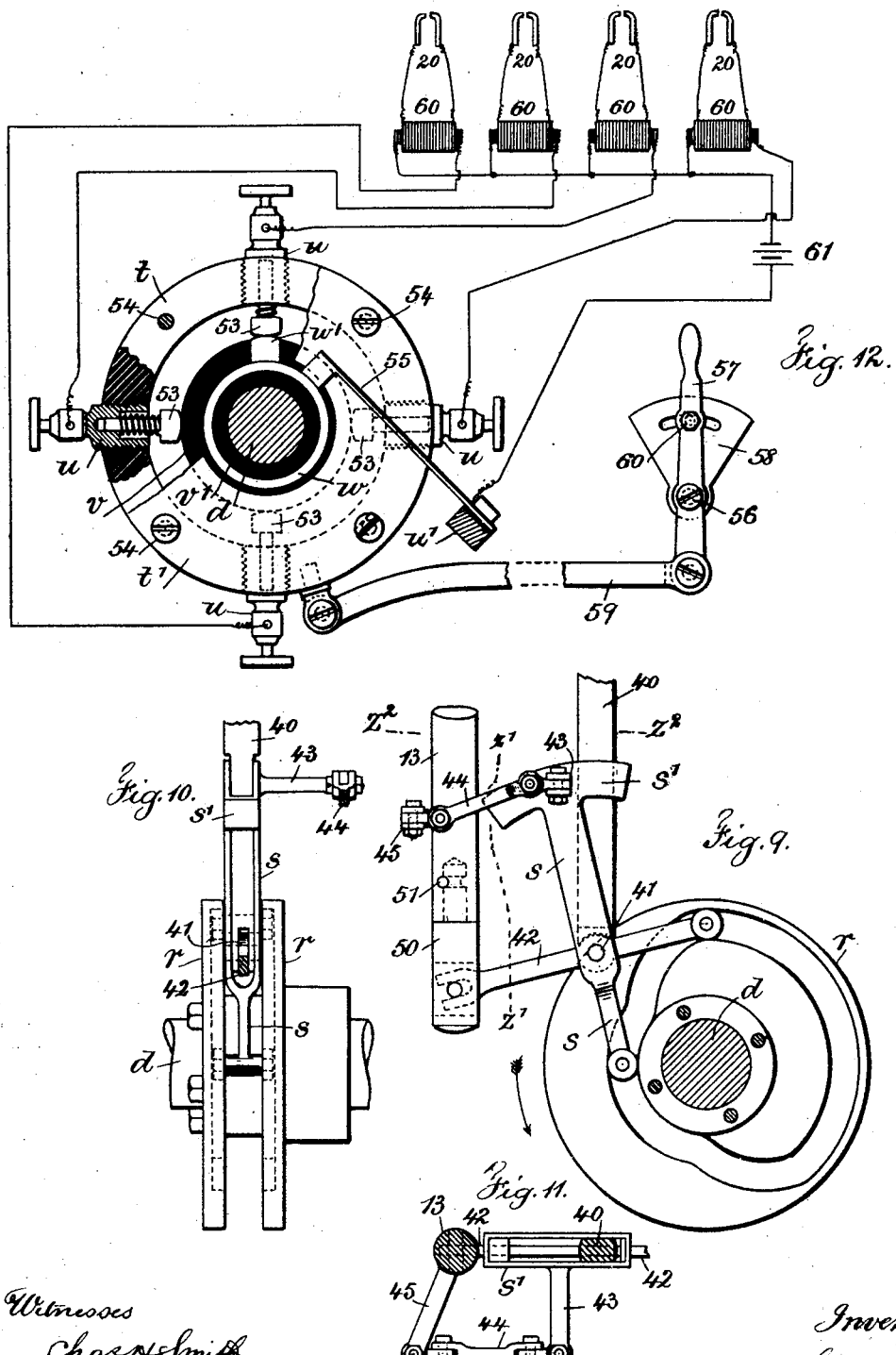
Witnesses
Chas H Smith
J. Staib
Inventor
Walram S. Browne.
for Harold Serrell
atty No. 788,579. PATENTED MAY 2, 1905.
W. S. BROWNE.
GAS ENGINE.
APPLICATION FILED APR. 11, 1903.
6 SHEETS—SHEET 6.
Fig. 14
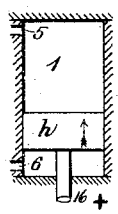 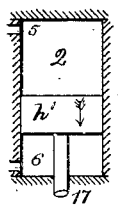 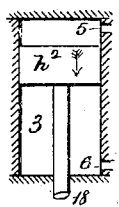 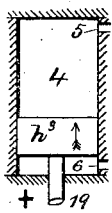 Series 1.
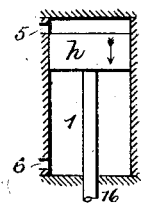 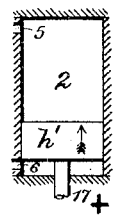 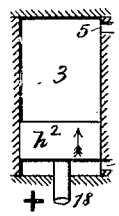 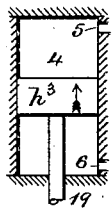 Series 2.
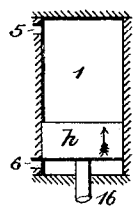 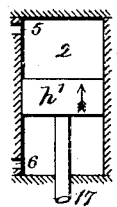 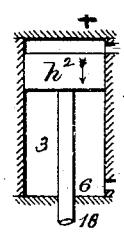 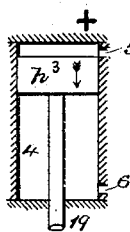 Series 3.
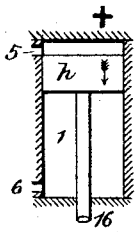 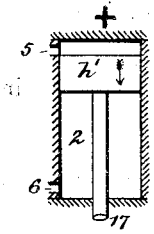 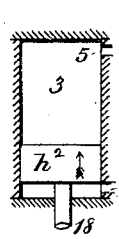 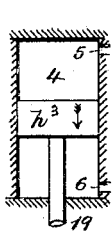 Series 4.
Witnesses
Chas H Smith
J. Staib
Inventor
Walram S. Browne
per Harold Serrell
Atty No. 788,579.

Patented May 2, 1905.

UNITED STATES PATENT OFFICE.

WALRAM S. BROWNE, OF NEW YORK, N. Y.

GAS-ENGINE.

SPECIFICATION forming part of Letters Patent No. 788,579, dated May 2, 1905.

Application filed April 11, 1903. Serial No. 152,126.

*To all whom it may concern:*

Be it known that I, WALRAM S. BROWNE, a citizen of the United States, residing in the borough of Brooklyn, county of Kings, city and State of New York, have invented an Improvement in Gas-Engines, of which the following is a specification.

It has heretofore been well known in this art to employ four cylinders—that is, four-cycle gas-engines; but in such devices there was only one explosion of the gas and air mixture for each revolution of the main shaft, the pistons not subject to the force of the explosion either drawing in gas and air or compressing the same previous to the explosion or exhausting. Consequently a high pressure was required to effect the operation of the device, as such pressure was required not only for the operation of the engine, but for the compression of the gas for the following explosion, and in these devices it was also necessary to employ a muffler, which was detrimental, as the same exerted a back pressure and used up considerable energy from the power of the engine, and, furthermore, in such structure the cylinders were liable to be overheated.

The object of my invention is to overcome these difficulties and to construct a gas-engine having a multiplicity of cylinders and pistons, so that there shall be an impulse explosion every quarter-revolution of a slow-moving or power crank-shaft, or, in other words, an impulse explosion in each cylinder—that is, in all the cylinders during each revolution of said shaft. I, however, prefer that there shall be two impulse explosions in each cylinder during each revolution of said shaft. In an effort to accomplish this result and in carrying out my invention I employ a four-cylinder water-jacketed structure in one casting, with pistons moving in said cylinders, with ports connecting the cylinders at the respective ends, and with a central valve device to which limited longitudinal and rotary movements are imparted, so that cross-ports in the lower end of the valve may alternately connect with the lower ends of the cylinders while the upper ports are closed and ports in the upper ends of the valve structure alternately connect with ports of other opposite cylinders when the ports at the lower ends are closed off. In my improvement all four cylinders are provided at their respective ends with means for exhaust, and the commingled air and gas is drawn in at opposite ends of two adjacent cylinders, compressed therein, and passed across through the ports to expand in similar ends of adjacent cylinders, the electric sparks for the explosions being produced in the latter cylinders, so that each explosion takes place in two cylinders at the same time. The respective pistons are connected in pairs, two by connecting-rods to the cranks of the fast-moving shaft set at one hundred and eighty degrees apart and the other two pistons to connecting-rods extending to cranks of a slow-moving shaft set at ninety degrees apart, the latter or slow-moving shaft being the power-shaft, and the said shafts are connected together by pairs of gears in the ratio of two to one, the large gears being upon the slow-moving or power shaft and the small gears upon the fast-moving or auxiliary shaft. Suitable devices are employed and actuated by a cam upon the slow-moving shaft, said devices acting in unison for the purpose of raising and lowering and imparting a partial forward and backward rotation to the valve structure placed centrally of the four cylinders, and electrical devices are provided upon the slow-moving shaft connected by a system of wiring to the spark-points through a battery, so that with each revolution of the slow-moving or power shaft four sparks are created, one for each.

The details of construction and the relation of the parts, as well as the operation, are hereinafter more particularly described.

In the drawings, Figure 1 is an elevation at one side, representing my improved engine. Fig. 2 is an elevation of the same at right angles to Fig. 1. Fig. 3 is a vertical section upon the lines $x\ x$ of Figs. 5 and 6. Fig. 3ª is a detached vertical section at right angles to a part of Fig. 3—namely, through a gas and air valve. Fig. 4 is a vertical section at the lines $y\ y$ of Figs. 5 and 6. Fig. 5 is a sectional plan at the lines $x'\ x'$ of Figs. 3, 4, and 7. Fig. 5ª is a horizontal section through the ports in the upper end of the central valve, Fig. 7, in their relation to the parts shown in Fig. 5. Fig. 6 is a sectional plan at the lines $y'\ y'$ of Figs. 3, 4, and 7. Fig. 7 is a vertical section at the lines $z\ z$ of Figs. 5 and 6. Figs. 8 and $8^a$ are elevations of adjacent cams upon the main or slow-moving shaft for operating the exhaust-valves. Fig. 9 is an elevation of the cam and devices for actuating the main central valve that admits gas and air to the cylinders; and Fig. 10 is a sectional elevation of the parts shown in Fig. 9 at the line $z'\ z'$, Fig. 9. Fig. 11 is a sectional plan at the line $z^2\ z^2$ of Fig. 9. Fig. 12 is a sectional elevation and diagrammatic view of the electrical devices, including a battery, for producing a spark at the spark-points; and Fig. 13 is a vertical section of one of the pistons. Figs. 9, 10, 11, 12, and 13 are of exaggerated size over the other figures for clearness. Fig. 14 represents by a series of diagrammatic views the various positions of stroke of the pistons in a complete cycle of movements during one rotation of the slow-moving shaft and two rotations of the fast-moving shaft, and Fig. 15 is a sectional view representing the preferred form of arranging the gas and air valves.

The main frames $a\ a'$ are advantageously provided at their lower ends with strap devices $b\ b'$, by which connections are made with suitable supporting-bars $c$ of the machine for carrying the engine structure. The crank-shafts $d\ d'$ are in suitable bearings in these frames $a\ a'$, and the cast body $e$ is connected to and supported by the said frames. This cast body is formed with a central aperture and with cylinders 1, 2, 3, and 4, with exhaust-ports 5 in series at the upper or head portion of the body and with exhaust-ports 6 in series at the lower or foot end of said cylinders, so that there are exhaust-ports at the respective ends of each cylinder. A gas and air reservoir structure $e'$ is preferably formed integral with the cast body $e$ at one side, (see especially Figs. 3 and 5,) the same, by reference to Fig. 3, comprising two upright portions and a central cross portion. This cast body is also provided with gas-ports 7 at one side connecting the respective upper and lower ends of the cylinders 1 and 3 with the gas and air reservoir $e'$. In this cast body there are cross-ports 8 connecting the upper ends of the cylinders 1, 2, 3, and 4 with the central aperture and other cross-ports, 9, connecting the lower ends of the cylinders 1, 2, 3, and 4 with the central aperture, and at the respective ends of the cylinders 2 and 4 and diametrically across the cast body from the gas-ports 7 there are sparking apertures 10. The cast body $e$ is provided at its respective ends and covered with the cylinder-heads $e^2\ e^3$ except at the central aperture, where there are provided, as will be seen by reference to Fig. 7, flanges of the cast body that project through the openings in the cylinder-heads $e^2\ e^3$. In this aperture there is a central valve $f$, having upper curved ports 11 (see Fig. 5$^a$) and also lower cross-ports 12. (See Fig. 6.) This central valve is carried by a valve-stem 13, and in the axial line of said valve the said ports 11 and 12 are farther apart than the vertical distance of the ports 8 9 of the cast body to the extent (see Fig. 7) that when the lower cross-ports 12 are in line with the ports 9 (see Figs. 6 and 7) the upper curved ports 11 are sufficiently above the ports 8 of the cast body so that the said ports 8 are closed off entirely. On the other hand, if this valve is lowered to bring the cross-ports 8 and the upper curved ports 11 into coincidence the lower ports 12 come sufficiently below the ports 9 to completely close off these ports 9, and it is to be remembered that when either the set of ports 8 or the set of ports 9 is thus closed off there is no communication between the respective cylinders at the upper or lower ends. I provide plugs $g$ having exteriorly-threaded portions that are received into apertures in the cast body through which the valve-seats 14 are introduced, and these valve-seats are secured in the exhaust-ports 5 6 of the cast body, that communicate with the cylinders 1 2 3 4 at their respective ends, and these plugs $g$ cover the seats for the exhaust-valves $f'$, and the alined parts of the cast body are perforated for the stems of said exhaust-valves $f'$, forming guides therefor. The plugs $g'$ are very similar to the plugs $g$— that is to say, they have exteriorly-threaded portions which screw down into the reservoir portions of the cast body, and they cover the seats $e'$ for the gas and air valves 15. In this case, however, the stems of the gas and air valves pass into and are guided in apertures in the plugs with springs around the stems of said valves between the head of the valves and the under surface of the plugs $g'$. Fig. 3$^a$ shows a section of one of the plugs $g'$ in position in the cast body with one of the valves 15, and as the same are all alike they do not require further illustration.

Within the cylinders 1 2 3 4 are pistons $h$ $h'\ h^2\ h^3$, to which are connected piston-rods 16, 17, 18, and 19, the same extending through suitable stuffing-boxes in the lower cylinder-head $e^3$, and 20 represents sparking devices at the respective ends of the cylinders 2 and 4, placed in the apertures 10 made in the cast body $e$. The frames $a\ a'$ are made with guide-plates $a^2$ extending from the two-part portions of said frames $a\ a'$ in line toward one another, and between them are other guide-plates $a^3$, occupying central positions, and these pairs or series of guide-plates are connected by bracket-frames $i$, $i'$, and $i^2$, the said frames being between and at either side outside of the guide-plates $a^2$ and $a^3$ and connected thereto by plates and bolts. (See especially Figs. 1 and 2.) These guide-plates $a^2\ a^3$ form slideways for the pairs of piston-rod heads $k\ k$—that is to say, the heads $k$ of the piston-rods 17 and 19 and the heads $k$ of the piston-rods 16 and 18.

Links $l$ are connected at one end to the piston-rod heads $k$ and at their other ends to the cranks $m$, which are formed as parts of the slow-moving or power shaft $d$. Similar piston-rod heads are connected to the pair of links $l'$, which links at their other ends are connected to the cranks $m'$ of the fast-moving shaft $d'$. The cranks $m$ of the slow-moving shaft are set at ninety degrees apart, while the cranks $m'$ of the fast-moving or auxiliary shaft $d'$ are set at one hundred and eighty degrees apart. On the shaft $d$ are large gears $n$ and on the auxiliary shaft $d'$ small gears $o$, which gears are in the proportion of two to one—that is, to each revolution of the large gears $n$ there are two revolutions of the small gears $o$, and these gears tie the shafts $d$ $d'$ together to such an extent that they are compelled to travel in unison and in a regular progressive movement with the links, piston-rods, and pistons. From this it will be apparent that the pistons $h$ and $h^2$ and their piston-rods 16 and 18 travel just twice as fast as the pistons $h'$ and $h^3$ and their piston-rods 17 19, because the pistons $h$ and $h^2$ are connected to the shaft $d'$ and the pistons $h'$ and $h^3$ to the shaft $d$. As the shaft $d$ is the power-shaft, the devices for actuating the exhaust-valves and the main central valve necessarily receive their motion therefrom. Upon this shaft $d$ are cams in pairs, (see especially Fig. 1,) the cams 21 and 22 forming a pair at the left hand between the frame $a$ and the large gear $n$ and the cams 23 24 a pair at the right hand between the frame $a'$ and the large gear $n$. These cams are alike; but in setting the same upon the shaft the cams 23 and 24 are set one-quarter off of the cams 21 22, or, in other words, their circumferential location with reference to the circumferential location of the cams 21 22 varies one-quarter of the circumference. This is necessary for the proper timing of the movements of the devices which actuate the exhaust-valves progressively with the movement of the pistons.

Supports 27 are connected to the frames $a$ $a'$, and to these are pivotally connected rocker-arms 25 26, on the free ends of which arms are rollers running upon the surfaces of the cams 21 23. To the end of the arms 25 and 26, opposite to the rollers are pivoted vertical rods 29. These rods 29 pass through guides 28, and there are springs 30 around these rods 29 between the said guides 28 and pins that pass through the rods, and the upper ends of the rods are provided with arms 31, extending out at right angles from said arms and coming between the opposite ends of the stems of the valves $f'$ of the cylinders 1 3.

Vertical rods 32 of offset or staggered form have rollers at their lower ends bearing upon the surfaces of the cams 22 24. These rods pass through other guides, 28, and are provided with springs 33 between said guides and the offset portion of said arms, and at their upper ends said rods are provided with arms 34, which come between the projecting ends of the valve-stems of the cylinders 2 4. The function of the pair of springs 30 and the pair of springs 33 is to keep the rollers at the ends of the rocker-arms 25 26 and the rollers at the ends of the vertical rods 32 at all times against the surfaces of the cams 21 22 23 24. In the position of these cams and the pairs of vertical rods 29 and 32 and with reference to Figs. 3 and 4 it will be noticed that the exhaust of the cylinders 1 and 4 at their upper ends and 2 at the lower ends are open, and the closed exhaust-valves are at the lower ends of cylinders 1, 3, and 4 and at the upper ends of cylinders 2 and 3. The arrows in Figs. 3 and 4 indicate the present direction of the pistons $h$, $h'$, $h^2$, and $h^3$, and in view of the quarter-offset position of the cams 23 and 24 it will be apparent that with the revolution of the slow or power shaft $d$ the action of said cams will be a following progressive operation in relation to the operation of the cams 21 22. It will be further noticed in connection with the operation of the pairs of rods 29 32 and the arms at the upper ends of the same with reference to the positions of the pairs of cams that at one part of the revolution of said cams said arms are raising the stems of the exhaust-valves $f'$ at the upper ends of the cylinders 1 2 3 4 against the closing action of the springs around the stems of said valves, that in other positions of these cams these parts are pressing upon the stems of the exhaust-valves $f'$ at the lower portions of the cylinders 1 2 3 4 to open the same against the closing action of the springs around said stems, and that in the other position of said valves the arms 31 34 are midway between the free ends of said valve-stems in a state of rest without actual contact with any of said stems. These arms are timed and progressive with the rotation of the cams.

I provide a fixed rod-support 40, by preference passing through and secured to the center of bracket-frame $i'$. The lower end of this rod 40 is forked and provided with a pivot 41. A rocker-arm 42 passes through the forked end of the rod 40 and is connected thereto by the pivot 41. There are rollers on one end of the rocker-arm 42, and the opposite end is forked. On the slow or power shaft $d$ there is a double cam $r$ $r$—that is to say, two cam-plates—with similar opposing grooves. A yoke-arm $s$, with rollers on the lower ends, is also connected to the rod-support 40 by the pivot 41. This yoke-arm 40 above its lower end is bifurcated and straddles the fixed rod-support 40, and the rollers at the lower ends of the yoke-arm $s$ and at one end of the rocker-arm 42 are received in the grooves of the double cam $r$ $r$, the rocker-arm 42 and the lower part of the yoke-arm $s$ extending in between the separated parts of said cam, and motion is communicated to said rocker-arm and yoke-arm through their rollers by said cam. The upper end of the yoke-arm s is made as a strap s', formed with the bifurcated part of the same which extends around the fixed rod-support 40. (See Figs. 9, 10, and 11.) To this strap s' is connected an arm 43, and to the lower end of the adjacent valve-stem 13 is connected an arm 45, and a link 44 extends between the ends of the arms 43 45 and is connected to the same by pivot-couplings, so that the movement imparted by the cam r r to the rocker-arm s is communicated by the arms 43 45 and link 44 to the valve-stem 13 to impart thereto a turning movement in first one direction and then in the other, the extent and timing of said movements being controlled by the form of groove in the opposite faces of the double cam r r.

The auxiliary stem 50 is a prolongation of the valve-stem 13 at the lower end of the same. This auxiliary stem is mortised to receive the forked end of the rocker-arm 42 and provided with a transverse pin received in said forked end of said rocker-arm, and this auxiliary stem is provided with a reduced part passing into an aperture in the lower end of the valve-stem 13, said reduced portion having an annular groove, and a pin 51 passes substantially transversely of the valve-stem 13 and into the annular groove of the reduced part of the auxiliary stem for the purpose of connecting the valve-stem and the auxiliary stem together for the purpose of a unitary vertical movement and for the further purpose of permitting the auxiliary stem to be non-rotatable in its relation to the rocker-arm 42, while the valve-stem 13 is rotatable in relation to the yoke-arm s and the arms 43 and 45 and link 44, connecting the same with the valve-stem.

The action of the double cam r r upon the rocker-arm 42 is to swing the same in a vertical plane upon the pivot 41 and raise and lower the auxiliary stem 50, the valve-stem 13, and with these parts the central valve f, while the office of the yoke-arm s, the arms 43 and 45, and the link 44 is to impart a partial rotary forward and backward movement to the valve-stem 13 and the central valve f either in an elevated or depressed position. This is the device actuated by the slow or power shaft d for raising and lowering the central valve f, Figs. 5, 6, and 7, so as to bring the ports 12 at its lower end in or out of line with the crossing-ports 9 at the lower portions of the cylinders 1 2 3 4, its ports 11 into or out of line with the crossing-ports 8 at the upper ends of said cylinders, and to turn said central valve (see Fig. 6) so as to bring the crossing-ports 12 therein either into the relation shown in Fig. 6, where the cylinders 1 and 4 are connected, or into a relation where the cylinders 3 and 2 are connected, and also (see Figs. 5 and 5ª) to bring the ports 11 so as to connect cylinders 1 and 2 or cylinders 3 and 4 for working out the cycle of operations hereinafter described.

Referring now to Fig. 12, t represents an annulus or ring of suitable insulating or non-conducting material. At quarter-points in the circumference of this annulus t, or, in other words, at equal-spaced-apart intervals, socket binding-posts u extend through the ring or annulus t from the outer to the inner circumference, the outer portions of these devices being binding-posts of usual construction to receive and hold line-wires and the concealed parts, screw-sockets, made of varying apertures to receive the spring-actuated contact-blocks 53. From the drawing it will be noticed that these blocks are made with pins that pass into the socket portions of the binding-posts and with springs around said pins, also in part received within said socket binding-posts, the function of the springs being to move the contact-blocks 53 toward the center of the annulus or ring t.

Upon the power or slow-moving shaft d and outside of the frame a' (see Fig. 1) the devices now being described are placed, and upon this shaft d I place sleeves v v', of insulating material, central with one another and with an interposed metal ring or sleeve w, the sleeve v' being next the shaft, the ring w outside thereof, and the sleeve v outside of the ring or sleeve w, the outer surfaces of the contact-blocks 53 bearing upon the surface of the sleeve v, and I provide disk sides t' to the annulus or ring t, which have open centers, but are of sufficient width to come at opposite sides of the sleeve v, performing the function of holding the annulus or ring t in position in a vertical plane by said disk sides t' coming at opposite sides of the sleeve v, and the said annulus or ring t and its sleeves are held in position by virtue of a link 59, pivotally connected at one end to said annulus or ring t by a stud and at its other end pivotally connected to a hand-lever 57, which lever is in turn connected to a fixed pivot 56 upon a locking-plate 58, said locking-plate having a curved mortise in which and also through the adjacent part of the hand-lever 58 is a bolt 60 for clamping the said hand-lever 58 to the locking-plate 57. The disk sides t' are secured to the annulus or ring t by bolts 54. A metal block w' is inserted in the outer sleeve v, of insulating material. Its outer surface projects slightly beyond said sleeve, and its base is preferably securely fastened to the metal ring or sleeve w. This part w projects beyond the surface of one of the disk sides t', and a contact-arm 55, connected at one end to a fixed support u', is provided at its opposite end with a block of metal which bears upon the surface of the ring or sleeve w.

In Fig. 12 I have shown the four spark-points 20 and four induction-coils 60, to the opposite ends of the secondary coils of which the wires from the spark-points are connected, and other wires from the primary of the induction-coils, arranged in suitable circuits, extend to the four socket binding-posts $u$ and through the battery 61, one wire from the battery extending to the fixed support $u'$ of the arm 55. In the position of the parts Fig. 12 the current passes from the battery 61 to the arm 55 at the fixed support $u'$, through this arm 55 and the block on its free end to the metal ring or sleeve $w$, from this to the metal block $w'$, thence to the contact-block 53, from this to the socket binding-post $u$, and by wire to the primary of one of the induction-coils 60, and back to the battery, and the induced current set up in the secondary of the induction-coil produces a spark at the spark-points 20. As the slow-moving or power shaft $d$, the sleeves $v\,v'$, and the sleeve or ring $w$ turn in the direction of the arrow the metal block $w'$ progressively establishes the electric circuit through the several contact-blocks $w$ to thus pass a spark at the spark-points 20 and from four sparks in each complete rotation of the shaft $d$ for the four explosions which take place in the cylinders 1, 2, 3, and 4 each complete cycle of rotation of the power-shaft $d$.

Referring to Figs. 3, 4, and 13, Fig. 13 is a section of one of the pistons, and I prefer to make the four pistons alike and to provide circumferential packing-rings of usual form therefor. I form one or more transverse holes 62 through the piston and an alining transverse hole through the piston-rod, an axial hole 63 in the end of the piston-rod, recessed, preferably, at the end, and groove the piston-rod circumferentially in line with the axial hole, and I prefer to employ oil-cups 64 in the cylinder-head $e^2$, set axially over the pistons, and to make holes through the cylinder-head $e^2$, also in the axial line of the piston-rod, for the purpose of lubricating the several pistons in a convenient, accurate, and desirable manner in view of the fact that their movements are very rapid. The oil from each oil-cup 64 flows through the hole 65 in the cylinder-head $e^2$ and drop by drop falls into the hole 63 in the end of the piston-rod and from the same flows into the transverse hole 62, and as the oil emerges it flows onto the surface of the cylinder and is spread by the action of the piston, and where similar holes to 62 are made through the piston at right angles to the holes 62 then the oil passes from the hole 63 around the annular groove in the piston-rod into the other holes at right angles to the hole 62. I may employ several transverse holes similar to the hole 62 in the pistons for facilitating this lubrication.

Considering the further and more full operation of the pistons $h$, $h'$, $h^2$, and $h^3$ with special reference to Figs. 2, 3, 4, 5, 6, and 14, in the relation of the parts shown and in view of the directions of movements, as indicated by the arrows, an explosion takes place in the lower ends of cylinders 1 and 4, the second explosion in the lower ends of cylinders 2 and 3, the third explosion in the head ends of cylinders 3 and 4, and the fourth explosion in the head ends of the cylinders 1 and 2. These four substantially double explosions are repeated with each complete cycle of movements of the pistons and with each single rotation of the power or slow-moving shaft $d$ and each double rotation of the auxiliary shaft $d$. Referring especially to Figs. 3, 4, and 14, the fast-moving piston $h$ in the cylinder 1 and the slow-moving piston $h^3$ in the cylinder 4 are now moving upward by the force of the simultaneous explosion in the lower portions of the cylinders 1 and 4, and these cylinders 1 and 4 are exhausted at the head ends. The piston $h'$ in the slow-moving cylinder 2 is going down by the force of a previous explosion at the head ends of the cylinders 1 and 2, (see fourth series of diagrams of Fig. 14,) and this cylinder 2 is exhausting at the lower end. The fast-moving piston $h^2$ in the cylinder 3 is going down and drawing in the mixture of gas and air for the second next explosion in the head ends of cylinders 3 and 4 (see third series of diagrams, Fig. 14) and compressing in the lower part of the cylinder 3 the gas and air mixture for the next explosion in the lower ends of cylinders 3 and 2. (See series 2 of diagrams, Fig. 14.) The + represents the cylinders in which simultaneous explosions take place, and by following the same through the four series the positions of the explosions may be noted as hereinbefore stated. In these movements as just described, and as the piston $h^2$ of the cylinder 3 nears the lower end of its stroke, the center valve $f$ is turned by the devices shown in Figs. 9, 10, and 11 from its position Fig. 6 so as to open communication at the lower ends of cylinders 3 and 2 for the next explosion, shown in the series 2 of the diagrams, Fig. 14. The valve $f$ is then drawn down by the devices Figs. 9, 10, and 11 so as to bring the ports 11 into position to open communication at the upper ends of the cylinders 3 and 4 for the next explosion, indicated in series 3, Fig. 14. After this the valve $f$ is turned to bring the left-hand of the ports 11 into position to open communication between the cylinders 1 and 2 for the next explosion in the upper ends of said cylinders, as indicated in Fig. 14 in series 4, the various explosions and the cycle of movements being similarly repeated with each rotation of the main or slow-moving power-shaft $d$. In the movements just described it is to be understood that the mixture of gas and air as drawn in by the pistons $h$ and $h^2$ of the cylinders 1 and 3 from the gas and air reservoir $e'$ through the gas-ports 7 at the respective ends of the cylinders 1 and 3 is first compressed by the pistons $h$ and $h^2$ in the respective ends of the cylinders 1 and 3 and then expanded into the upper or lower ends of the cylinders that coact with the cylinders 1 and 3, and then there is a measure of simultaneous compression in both cylinders before explosion, and like operations of compression, expansion, and compression continue throughout the various cycles and explosions, the explosions being effected by the electric current passed between the spark-points 20 progressively by the devices Fig. 12.

In the drawings, Figs. 8 and 8ª, I have indicated pins in the shaft $d$ engaging surface grooves 70 in the cams 21 22. The cams 23 24 are also similarly constructed, and all of said cams are preferably loose on the shaft $d$ and are carried around with the shaft in its rotation by these pins bearing, as shown, at the ends of said grooves. I have shown and prefer to employ such construction to provide for the possibility of reversing the mechanism by any suitable reversing devices, as in such event the pins in the shaft move through the grooves while the cams remain stationary, and when the pins come to the ends of the grooves the cams start to revolve with the shaft in their proper relation thereto. In this construction the cam $r\ r$ does not require to be changed in its position on the shaft $d$.

As explosions are effected in the respective ends of each cylinder during each revolution of the main crank or power shaft, it necessarily follows that less force is required to maintain the operation of the device than heretofore has been employed with similar devices in this art. Consequently the exhaust will be at less pressure than heretofore.

It is preferable to arrange the gas and air valves 15, as shown in the section Fig. 15, so that each valve-stem projects from the inner face of the valve and the spring is around said stem and between a guide upon the inner side of the valve-seat and a fixed device upon the valve-stem. By this arrangement the valve-stems and springs are perfectly inclosed within the vertical portions of the case $e'$ when the valves are upon their seats, and thereby the springs of said valves are not exposed to the heated gases from the explosions, which heated gases would be liable to injure the temper of said springs.

I claim as my invention—

1. In a gas-engine, the combination with four cylinders, their pistons, piston-rods and a power-shaft, of devices providing for an impulse explosion in each cylinder during one complete revolution of the power-shaft, each explosion being in connected corresponding ends of two cylinders.

2. In a gas-engine, the combination with four cylinders, their pistons, piston-rods and a power-shaft, of devices providing for an impulse explosion in each cylinder during one complete revolution of the power-shaft, each explosion being in connected corresponding ends of two cylinders, and the first two explosions being at similar ends of opposite connected pairs of cylinders, and the second two explosions at the other similar ends of opposite connected pairs of cylinders.

3. In a gas-engine, the combination with four cylinders, their pistons, piston-rods and a power-shaft, of devices providing for two impulse explosions in each cylinder during one complete revolution of the power-shaft, each explosion being in connected corresponding ends of two cylinders.

4. In a gas-engine, the combination with four cylinders, their pistons, piston-rods and a power-shaft, of devices providing for two impulse explosions in each cylinder during one complete revolution of the power-shaft, each explosion being in connected corresponding ends of two cylinders, and the first two explosions being at similar ends of opposite connected pairs of cylinders, and the second two explosions at the other similar ends of opposite connected pairs of cylinders.

5. In a gas-engine, the combination with four cylinders, their pistons, piston-rods and a power-shaft, of devices providing for two impulse explosions in each cylinder during one complete revolution of the power-shaft, devices at the respective ends of each cylinder providing for an exhaust, devices at the respective ends of two adjacent cylinders for drawing in the mixture of gas and air, devices at the respective ends of the two opposite cylinders providing for exploding the mixture of gas and air, and means for connecting the respective cylinders for passing the compressed mixture of air and gas across from one to the other.

6. In a gas-engine, the combination with a series of cylinders, their pistons, piston-rods and a power-shaft, of devices providing for an impulse explosion in each cylinder of the series during one complete revolution of the power-shaft, devices at the respective ends of each cylinder providing for exhaust, ports and devices providing for communication between the respective ends of the cylinders, devices for drawing in a mixture of gas and air into predetermined cylinders, and devices at other predetermined cylinders providing for the explosion of said mixture.

7. In a gas-engine, the combination with four cylinders, their pistons, piston-rods and a power-shaft, of devices at the respective ends of the four cylinders providing for an exhaust, means for admitting a mixture of gas and air to opposite ends of predetermined cylinders, means for exploding the mixture of gas and air at opposite ends of other predetermined cylinders, and means providing for progressive explosions in series, such as, first in the lower ends of cylinders 1 and 4, second in the lower ends of cylinders 2 and 3, third in the upper ends of cylinders 3 and 4, and fourth in the upper ends of cylinders 1 and 2, and progressively repeating said order of explosions.

8. In a gas-engine, the combination with four cylinders, their pistons, piston-rods and a power-shaft, of means at the respective ends of the four cylinders providing for an exhaust, means providing for an entrance of commingled gas and air at the opposite ends of two adjacent cylinders and for compressing the mixture therein, means timed with the movements of the pistons of said cylinders for passing said mixture across through connecting-ports to expand in similar ends of adjacent cylinders, electric-spark devices providing for explosions of the compressed gas and air in the respective ends of the latter cylinders, so that each explosion takes place in two cylinders at the same time.

9. In a gas-engine, the combination with a cast body having therein four cylinders arranged in parallel planes about an open center, exhaust-ports at opposite ends of said cylinders, ports for the admission of combined gas and air at the respective ends of two adjacent cylinders, crossing ports in pairs between the respective cylinders, a valve occupying the open center of the cast body and having ports therein adapted to open communication between the pairs of ports at the respective ends of the cylinders, means for longitudinally moving and for turning the said valve in a timed relation to open communication between the said ports, and means for exploding the mixture of gas and air in the ends of opposite cylinders to those in which the mixture of gas and air has been drawn.

10. In a gas-engine, the combination with four cylinders, their pistons and piston-rods, of a main slow-moving or power shaft, links connecting two of the piston-rods with the cranks of said power-shaft, a fast-moving or auxiliary shaft and other links connecting the other two piston-rods with cranks of the said auxiliary shaft, gears upon said main and auxiliary shafts meshing with one another and connecting said shafts in the ratio of two to one, so that the auxiliary shaft revolves twice to one revolution of the power-shaft.

11. In a gas-engine, the combination with four cylinders, their pistons and piston-rods, of a main slow-moving or power shaft, links connecting two of the piston-rods with the cranks of said power-shaft, a fast-moving or auxiliary shaft and other links connecting the other two piston-rods with cranks of the said auxiliary shaft, gears upon said main and auxiliary shafts meshing with one another and connecting said shafts in the ratio of two to one, so that the auxiliary shaft revolves twice to one revolution of the power-shaft, the respective cranks on the power-shaft being set at ninety degrees apart and the respective cranks on the auxiliary shaft set at one hundred and eighty degrees apart, so that the pistons of two of the cylinders travel at twice the speed of the other two pistons, and so that the pistons connected to the slow-moving shaft shall bear a closer relation to one another than those connected to the auxiliary shaft.

12. In a gas-engine, the combination with four cylinders arranged in parallel planes, their pistons and piston-rods, and connecting-ports extending across between the respective cylinders at opposite ends, of a valve placed at the center of the four cylinders, with ports in said valve adapted to establish communication between the crossing ports of the cylinders, the ports of the valve being placed at a greater distance apart longitudinally of the valve than the distance separating the respective connecting-ports, and means for imparting a longitudinal movement to said valve and also a rotary movement whereby the ports at the lower ends of the cylinders may be connected through the valve while the ports at the upper ends are closed, and vice versa, and whereby with the turning movement of the valve in relation to its longitudinal movement opposite pairs of cylinders may be alternately connected.

13. In a gas-engine, the combination with four cylinders, their pistons and piston-rods, of a power-shaft having cranks set at ninety degrees apart, links connecting the said cranks with the piston-rods of two pistons, an auxiliary or fast-moving shaft with cranks at one hundred and eighty degrees apart, and links connecting said cranks with the piston-rods of the other two pistons, gears mounted upon said shafts and meshing with one another for the purpose of connecting the said shafts to cause them to revolve together, said gears being in the relation of two to one so that the fast-moving shaft revolves at twice the speed of the main or power shaft, whereby the pistons connected to the fast-moving shaft occupy extreme or opposite relations to one another and the pistons connected to the slow-moving shaft are only separated by one-quarter the length of their stroke, a series of exhaust-ports, a series of ports for admitting gas and air, a series of explosion devices, a central valve common to all the cylinders, and devices connected to and operated from the main or power shaft alone for effecting the progressive movements and functions of the several devices, substantially as set forth.

14. In a gas-engine, the combination with four cylinders 1, 2, 3, 4 and their pistons arranged about a common center and having crossing ports 9, connecting the same at the lower ends and crossing ports 8, connecting the same at the upper ends, of a cylindrical valve placed centrally and intermediate of the four cylinders having crossing ports 12, adapted to be alined with the crossing ports 9, and curved ports 11, at the opposite ends of said valve adapted to be brought into the desired relation with the crossing ports 8.

15. In a gas-engine, the combination with four cylinders, 1, 2, 3, 4 and their pistons arranged about a common center and having crossing ports 9 connecting the same at the lower ends and crossing ports 8, connecting the same at the upper ends, of a cylindrical valve placed central and intermediate of the four cylinders having crossing ports 12, adapted to be alined with the crossing ports 9, and curved ports 11, at the opposite ends of said valve adapted to be brought into the desired relation with the crossing ports 8, said ports 11 and 12 of the valve being placed a different distance in the length of the valve than the distance between the ports 8 and 9 of the cylinders, and devices for actuating the said valve to impart longitudinal and partial rotary timed movements thereto.

16. In a gas-engine the combination with four cylinders, 1, 2, 3, 4 arranged about a common center and in parallel planes and their pistons, of exhaust-ports and valves $f'$, at the respective ends of said cylinders and coming at diametrically opposite sides of the same as arranged in a group, ports 7, and valves at the opposite ends of the cylinders 1 and 3 for admitting thereto a mixture of gas and air from a common reservoir, apertures 10 and spark-points 20 coming at opposite ends of the cylinders 2 and 4, and diametrically opposite in the series to the ports, and valves for the entrance of gas and air, crossing ports 8 and 9 at the respective ends of the said group of cylinders, a valve $f$ located in the aperture at the center of said cylinders and crossing ports and having ports 12 and 11 at its respective ends, and means for imparting longitudinal and partial rotary movements to the said valve $f$.

17. In a gas-engine, the combination with four cylinders, 1, 2, 3, 4, arranged about a common center, and in parallel planes and their pistons, of exhaust-ports and valves $f'$ at the respective ends of said cylinders and coming at diametrically opposite sides of the same as arranged in a group, ports 7 and valves at the opposite ends of the cylinders 1 and 3 for admitting thereto a mixture of gas and air from a common reservoir, apertures 10 and spark-points 20 coming at opposite ends of the cylinders 2 and 4, and diametrically opposite in the series to the ports and valves for the entrance of gas and air, crossing ports 8 and 9 at the respective ends of the said group of cylinders, a valve $f$ located in an aperture at the center of said cylinders and crossing ports and having ports 12 and 11 at its respective ends, means for imparting longitudinal and partial rotary movements to the said valve $f$, the said exhaust-port valves $f'$ being spring-closing in reversed positions at the respective ends of the cylinders, spring-controlled rods and arms extending therefrom and adapted to come in contact with the stems of the valves $f'$ for operating the same, and means for actuating the said valve-rods and arms.

18. In a gas-engine, the combination with four cylinders 1, 2, 3, 4, in parallel planes arranged about a common center, of the exhaust-ports 5 and exhaust-port valves $f'$ at opposite ends of said cylinders and at opposite sides of the series, said valves $f'$ being spring-closing in reversed positions and arranged in pairs above one another, spring-controlled rods 29 and 32 and arms connected therewith, the free ends of which come between the stems of the said valves $f'$, cams 21, 22, 23, 24, and a main power-shaft $d$ upon which the said cams are mounted, said cams in their rotation actuating the said spring-controlled rods 29 and 32 for the operation of the exhaust-valves.

19. In a gas-engine, the combination with four cylinders 1, 2, 3, 4, and their pistons arranged about a common center and having crossing ports 9 connecting the same at the lower ends and crossing ports 8 connecting the same at the upper ends, of a cylindrical valve placed central and intermediate of the four cylinders having crossing ports 12 adapted to be alined with the crossing ports 9 and curved ports 11 at the opposite ends of said valve adapted to be brought into the desired relation with the crossing ports 8, ports 7 and valves 15 therein at opposite ends of the cylinders 1 and 3, said valves being automatic in their action and spring-controlled, a gas and air reservoir $e'$ with vertical members in the upper ends of which are located the said valves 15, and a central connecting member forming a union between the upright members and the source of supply of the gas and air mixture.

20. In a gas-engine, the combination with four cylinders, 1, 2, 3, 4, and their pistons arranged about a common center and having crossing ports 9, connecting the same at the lower ends and crossing ports 8 connecting the same at the upper ends, of a cylindrical valve placed central and intermediate of the four cylinders having crossing ports 12 adapted to be alined with the crossing ports 9, and curved ports 11 at the opposite ends of said valve adapted to be brought into the desired relation with the crossing ports 8, ports 7 and valves 15 therein at opposite ends of the cylinders 1 and 3, said valves being automatic in their action and spring-controlled, a gas and air reservoir $e'$ with vertical members in the upper ends of which are located the said valves 15, and a central connecting member forming a union between the upright members and the source of supply of the gas and air mixture, spark-apertures 10 and sparkpoints 20 therein coming at the respective ends of the cylinders 2 and 4, a power-shaft, a battery, a series of induction-coils agreeing in number with the spark-points and cylinders, and devices having a progressive action mounted upon the power-shaft and electrically operative for passing electric currents in progression through the induction-coils so as to establish induced currents for creating the spark at the spark-points.

21. In a gas-engine, the combination with the four cylinders 1, 2, 3, 4 arranged in parallel planes around an open center, and their pistons and piston-rods, of a main shaft, a valve $f$ centrally placed in relation to the cylinder, and the axis of which is in a plane parallel to the axes of the cylinders, and crossing ports at the respective ends of the cylinders and at the respective ends of the valves, and means actuated and controlled by the rotary movement of the main power-shaft for imparting longitudinal and partial back-and-forth rotary movements to the said valve for the purpose of alining the ports therein with the ports of the cylinders.

22. In a gas-engine, the combination with the four cylinders 1, 2, 3, 4, arranged in parallel planes around an open center, and their pistons and piston-rods, of a main shaft, a valve $f$ centrally placed in relation to the cylinder, and the axis of which is in a plane parallel to the axes of the cylinders, and crossing ports at the respective ends of the cylinders and at the respective ends of the valves, a fixed support 40, a cam $r$, $r$, on the main shaft $d$, rocker-arms 42 and $s$, connected to a common pivot at the lower end of said support-rod 40, and means connecting said rocker-arms with the stem of the valve $f$, for imparting longitudinal and partial back-and-forth rotary movements to the same and the valve, substantially as set forth.

23. In a gas-engine, the combination with the four cylinders 1, 2, 3, 4 arranged in parallel planes around an open center and their pistons, and piston-rods, of a main shaft, a valve $f$ centrally placed in relation to the cylinder and the axis of which is in a plane parallel to the axes of the cylinders, and crossing ports at the respective ends of the cylinders and at the respective ends of the valves, a fixed support 40, a pivot 41 at its lower end, a cam $r$, $r$ on the main shaft $d$, a rocker-arm 42 and a yoke-arm $s$, connected to the common pivot 41, the rocker-arm having a forked free end and the said yoke-arm having a strap portion $s'$ fitting around the fixed support 40, and said arms having rollers in grooves of said cam, a valve-stem 13 to the valve $f$, an auxiliary stem 50 at the lower end thereof having a reduced part passing into an aperture in the lower end of the stem 13, a pin 51 in a groove in the end of said reduced part for connecting the parts, the said stem 50 having a mortise in its lower end receiving the free forked end of the arm 42, and a pin engaging the same, an arm 43, link 44, and arm 45 connecting the yoke-arm with the valve-stem 13 whereby a longitudinal movement is imparted to the valve-stem 13 and valve $f$ by the rocker-arm 42 and partial rotary movement imparted thereto by the yoke-arm $s$ and connecting parts.

24. In a gas-engine, the combination with four cylinders, their pistons and piston-rods, of a main slow-moving shaft, an auxiliary fast-moving shaft, gears upon and connecting the respective shafts, cranks forming parts of the shafts and links connecting the same with the piston-rods and so arranged and timed as to bring pairs of the pistons progressively at either one end or the other of the said cylinders each quarter-revolution of the main or power shaft for the impulse explosions of the mixture of gas and air.

25. In a gas-engine, the combination with four cylinders, their pistons and piston-rods, of a main slow-moving shaft, an auxiliary fast-moving shaft, gears in the relation of two to one, the larger gear upon the main shaft and the smaller gear upon the auxiliary shaft connecting the respective shafts, cranks on the main shaft set at ninety degrees apart, and cranks on the auxiliary shaft set at one hundred and eighty degrees apart, and links connecting the cranks with said piston-rods and so arranged and timed as to bring pairs of the pistons progressively at either one end or the other of the said cylinders each quarter-revolution of the main or power shaft for the impulse explosions of the mixture of gas and air.

Signed by me this 7th day of April, 1903.

WALRAM S. BROWNE.

Witnesses:
   Geo. T. Pinckney,
   S. T. Haviland.